United States Patent
Mueller et al.

(10) Patent No.: US 6,913,147 B2
(45) Date of Patent: Jul. 5, 2005

(54) PACKAGING STRUCTURE HAVING A FRAME AND FILM

(75) Inventors: Walter B. Mueller, Inman, SC (US); Charles Kannankeril, North Caldwell, NJ (US)

(73) Assignee: Sealed Air Corporation (US), Saddle Brook, NJ (US)

( * ) Notice: Subject to any disclaimer, the term of this patent is extended or adjusted under 35 U.S.C. 154(b) by 132 days.

(21) Appl. No.: 10/147,704

(22) Filed: May 16, 2002

(65) Prior Publication Data

US 2003/0213719 A1 Nov. 20, 2003

(51) Int. Cl.⁷ .............................................. B65D 81/05
(52) U.S. Cl. ...................... 206/478; 206/583; 206/594; 428/35.2
(58) Field of Search ................................ 206/305, 320, 206/466, 478, 497, 521, 583, 591, 594, 722, 723; 428/34.9, 35.2

(56) References Cited

U.S. PATENT DOCUMENTS

| | | |
|---|---|---|
| 4,852,743 A | 8/1989 | Ridgeway |
| 4,923,065 A | 5/1990 | Ridgeway |
| 5,071,009 A | 12/1991 | Ridgeway |
| 5,287,968 A | 2/1994 | Ridgeway |
| 5,388,701 A | 2/1995 | Ridgeway |
| 5,678,695 A | 10/1997 | Ridgeway |
| 5,681,627 A | 10/1997 | Mueller |
| 5,695,840 A | 12/1997 | Mueller |
| 5,749,202 A | 5/1998 | Eichbauer |
| 5,752,362 A | 5/1998 | Eichbauer |
| 5,762,200 A | 6/1998 | Goudreau |
| 5,779,050 A * | 7/1998 | Kocher et al. .............. 206/497 |
| 5,789,046 A | 8/1998 | Mueller |
| 5,814,399 A | 9/1998 | Eichbauer |
| 5,871,101 A | 2/1999 | Alden |
| 5,893,462 A | 4/1999 | Ridgeway |
| 5,902,684 A | 5/1999 | Bullard et al. |
| 5,907,942 A | 6/1999 | Eichbauer |
| 5,907,943 A | 6/1999 | Eichbauer |
| 5,922,441 A | 7/1999 | Eichbauer |
| 5,976,682 A | 11/1999 | Eichbauer |
| 5,979,653 A * | 11/1999 | Owens et al. ............ 206/484.1 |
| 5,998,017 A | 12/1999 | Eichbauer |
| 6,010,006 A | 1/2000 | Ridgeway et al. |
| 6,027,776 A | 2/2000 | Mueller |
| 6,083,611 A | 7/2000 | Eichbauer et al. |
| 6,093,480 A | 7/2000 | Eichbauer |
| 6,148,590 A | 11/2000 | Ridgeway et al. |
| 6,148,591 A | 11/2000 | Ridgeway et al. |
| 6,187,869 B1 | 2/2001 | Gahleitner et al. |

(Continued)

OTHER PUBLICATIONS

Standard Test Method for Machine Direction Elastic Recovery and Permanent Deformation and Stress Retention of Stretch Wrap Film, ASTM D 5459–95, pp 785–787.

(Continued)

Primary Examiner—Jim Foster
(74) Attorney, Agent, or Firm—Daniel B. Ruble (57) ABSTRACT

A packaging structure useful as retention and suspension packaging. The packaging structure comprises a frame and a film connected to the frame. The film comprises first and second layers. The first layer is an outer layer of the film and comprises polyethylene polymer having a density of at least about 0.910 g/cc. The first layer comprises no more than about 20% of the total thickness of the film. The second layer comprises ethylene/alpha-olefin copolymer having a density of less than about 0.910 g/cc. The film has an elastic recovery in each of the transverse and longitudinal directions of at least about 60% measured according to ASTM D5459-95 at 100% strain, 30 seconds relaxation time, and 60 second recovery time.

36 Claims, 2 Drawing Sheets

U.S. PATENT DOCUMENTS

| | | | |
|---|---|---|---|
| 6,265,055 B1 | 7/2001 | Simpson et al. | |
| 6,289,655 B1 | 9/2001 | Ridgeway et al. | |
| 6,299,968 B1 | 10/2001 | Karaoglu et al. | |
| 6,302,274 B1 | 10/2001 | Ridgeway | |
| 6,311,844 B1 | 11/2001 | Ridgeway et al. | |
| RE37,699 E * | 5/2002 | Bradfute et al. | 428/34.9 |
| 6,410,648 B1 | 6/2002 | Sasaki et al. | |
| 6,488,972 B1 * | 12/2002 | Cerani | 426/110 |
| 6,627,273 B2 * | 9/2003 | Wolf et al. | 428/34.9 |

OTHER PUBLICATIONS

Standard Test Methods for Tensile Properties of Thin Plastic Sheeting, ASTM D–882, pp 194–199.

Standard Test Method for Specular Gloss of Plastic Films and Solid Plastics, ASTM D 2457–97, pp 11–15.

Standard Test Method for Transparency of Plastic Sheeting, ASTM D 1746–70, pp 76–78.

Standard Test Method for Flexural Properties of Unreinforced and Reinforced Plastics and Electrical Insulating Materials, ASTM D 790–00, pp 1–9.

Standard Test Method for Initial Tear Resistance of Plastic Film and Sheeting, ASTM D 1004–94a, pp 1–4.

Standard Test Method for Slow Rate Penetration Resistance of Flexible Barrier Films and laminates, ASTM F 1306–90, pp 1–4.

Standard Test Method for Haze and Luminous Transmittance of Transparent Plastics, ASTM D 1003–00, pp 1–6.

Standard Test Method for Density of Plastics by the Density–Grandient Technique, ASTM D 1505–98, pp 1–7.

Declaration of Tina Lorenzo–Moore dated Oct. 12, 2004.

Declaration of Scott Cobranchi dated Oct. 15, 2004.

Korrvu Anti–Static Retention Packaging, Sealed Air Corporation Technical Information Bulletin, Sep. 1996.

F. Segalini, Cryovac/Sealed Air Corporation, Technical & Analysis Report of Variowell film material (Internal Report, Feb. 13, 2002).

* cited by examiner fig. 1.

PACKAGING STRUCTURE HAVING A FRAME AND FILM

BACKGROUND OF THE INVENTION

The present invention relates to protective packaging structures that may be used to assist in protecting packaged articles from physical shock during transportation. For example, one form of useful protective packaging is known as "suspension packaging," which is adapted to "suspend" or hold a packaged article relatively tightly between two plastic films. Each film may be adhered to a supportive suspension frame that is sized to fit within a corresponding box.

Another useful form of protective packaging is known as "retention packaging," which is adapted to "retain" or hold a packaged article between a plastic film and a retention frame that may be sized to fit within a corresponding box. Examples of retention and suspension packaging are described in more detail in U.S. Pat. Nos. 4,852,743; 4,923,065; 5,071,009; 5,287,968; 5,388,701; 5,678,695; 5,893,462; 6,010,006; 6,148,590; 6,148,591; 6,289,655; 6,302,274; and 6,311,844, each of which is incorporated in its entirety by reference.

Although existing plastic films for suspension and retention packaging have performed well, the need still exists for such packaging structures utilizing cost effective films having acceptable physical performance characteristics for a given packaging application.

SUMMARY OF THE INVENTION

The present invention addresses one or more of the aforementioned problems.

A packaging structure comprises a frame and a film connected to the frame. The film comprises first and second layers. The first layer is an outer layer of the film and comprises polyethylene polymer having a density of at least about 0.910 g/cc. The first layer comprises no more than about 20% of the total thickness of the film. The second layer comprises ethylene/alpha-olefin copolymer having a density of less than about 0.910 g/cc. The film has an elastic recovery in each of the transverse and longitudinal directions of at least about 60% measured according to ASTM D5459-95 at 100% strain, 30 seconds relaxation time, and 60 second recovery time.

These and other objects, advantages, and features of the invention will be more readily understood and appreciated by reference to the detailed description of the invention and the drawings.

DETAILED DESCRIPTION OF THE INVENTION

Figure 1:
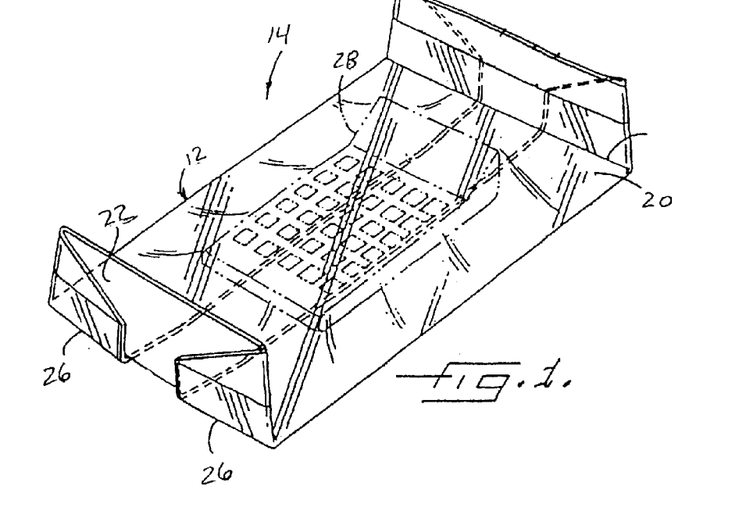
FIG. 1 is a perspective view of a retention packaging structure of the present invention retaining an article.

The packaging structure of the present invention may comprise, for example, a retention packaging structure 12 adapted for use as retention packaging 14. (FIG. 1.) Retention packaging structure 12 comprises film 20 connected to retention frame 22. For example, opposite ends of film 20 may each be adhered to flaps 26 so that when flaps 26 of frame 22 are folded away from the film to a retaining position shown in FIG. 1, packaged object 28 is held between film 20 and frame 22. Retention packaging structure 12 may be enclosed in a box (not shown).

Figure 2:
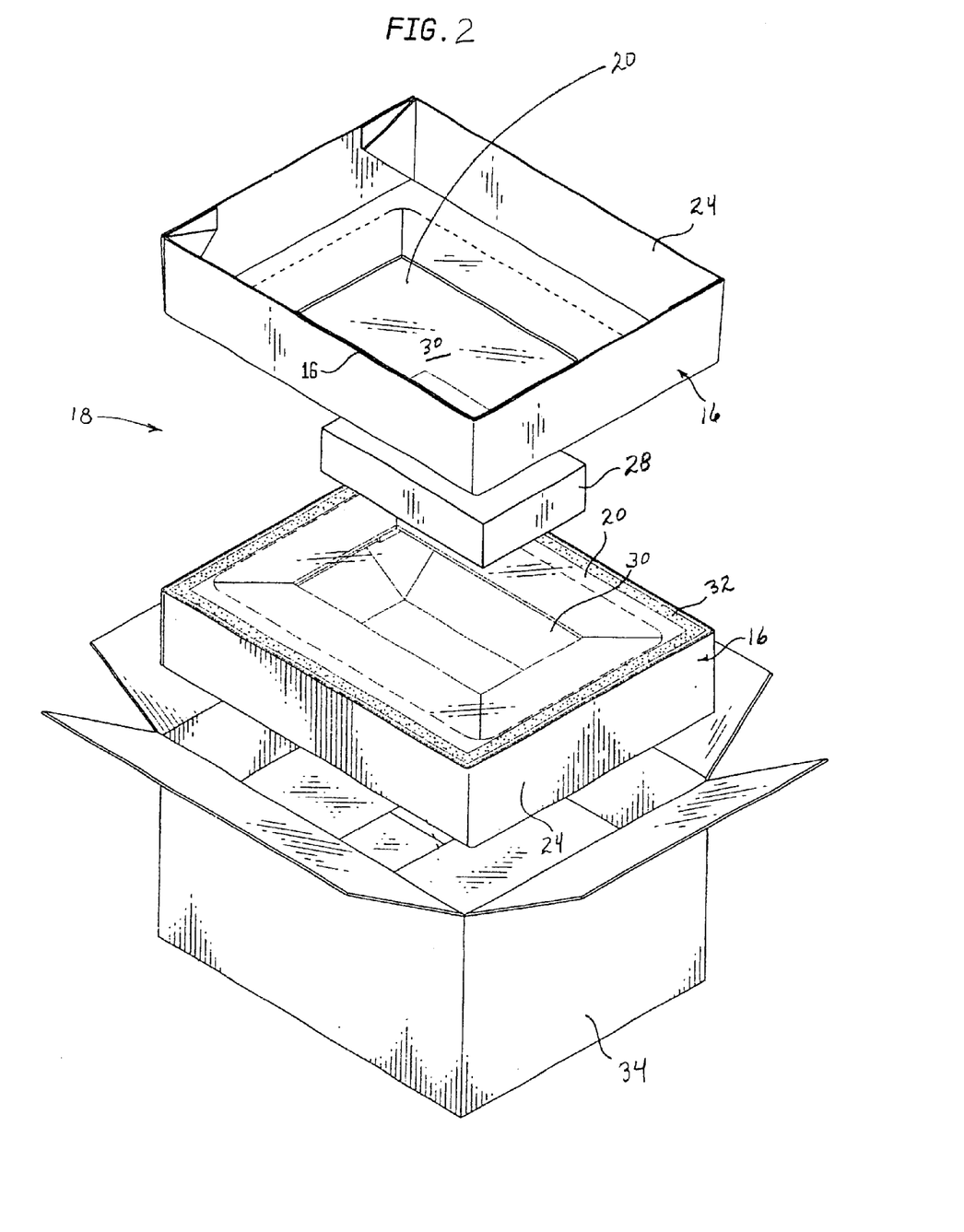
FIG. 2 is an exploded perspective view showing the use of two suspension packaging structures of the present invention for packaging an article in a box.

The packaging structure of the present invention may also comprise, for example, a suspension packaging structure 16 adapted for use in suspension packaging 18. (FIG. 2.) Suspension packaging structure 16 comprises film 20 connected to suspension frame 24. Suspension frame 24 may define an opening 30. Film 20 may be positioned to cover opening 30 and be adhered, for example continuously adhered, to frame 24 in perimeter zone 32 surrounding opening 30, as shown in FIG. 2. Packaged object 28 may be held or suspended between films 20 of opposing suspension packaging structures 16. The suspension packaging structures 16 may be enclosed in box 34. Frames 22, 24 may comprise a relatively rigid, foldable material, for example, paperboard, cardboard, and corrugated cardboard (e.g., single wall corrugated cardboard), that has sufficient physical performance characteristics for the desired packaging application.

Film 20 may be multilayer (i.e., include two or more layers) so that the layers in combination impart the desired performance characteristics to the film. Film 20 may comprise, for example, from 2 to 9 layers, three layers (FIG. 3), at least 3 layers, at least 4 layers, five layers (FIG. 4), at least 5 layers, from 2 to 4 layers, from 2 to 5 layers, and from 3 to 5 layers. As used herein, the term "layer" refers to an essentially discrete stratified film component that is coextensive with the film and has a substantially uniform composition.

Film 20 may have any total thickness as long as it provides the desired properties (e.g., flexibility, elasticity, optics, strength) for the given packaging application of expected use. The film 20 may have a thickness of less than about any of the following: 10 mils, 6 mils, 5 mils, 4 mils, 3 mils, 2 mils, 1.5 mils, and 1 mil. (A "mil" is equal to 0.001 inch.) The film 20 may also have a thickness of at least about any of the following: 0.5 mils, 1 mil, 1.5 mils, 2 mils, and 3 mils.

Figure 3:
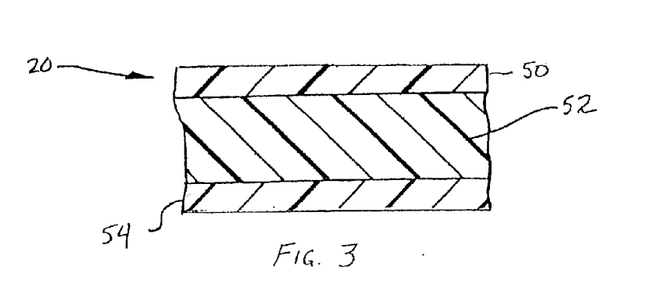
FIG. 3 is a fragmentary, representational sectional view of a three layer film useful in the packaging structures of FIGS. 1 and 2.
Figure 4:
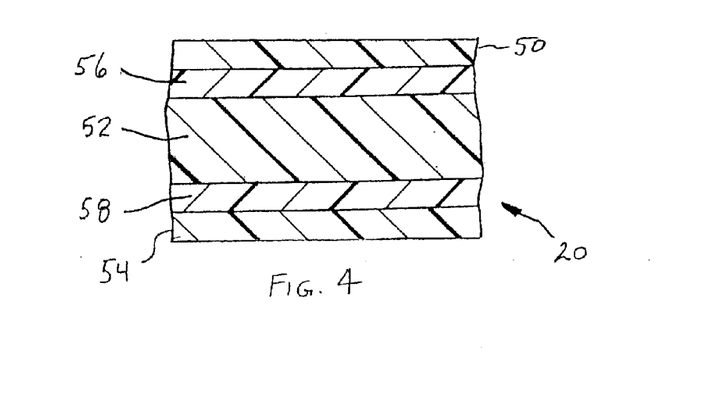
FIG. 4 is a fragmentary, representational sectional view of a five layer film useful in the packaging structures of FIGS. 1 and 2.

Film 20 comprises first layer 50. (FIGS. 3, 4.) The first layer 50 of the film is an outer layer of the film, that is, a layer that generally forms an external surface of the film and is thus directly adjacent and coextensive with only one other layer of the film. Accordingly, a film having two or more layers has two outer layers. Any layers of the film more than the two outer layers are interior layers of the film. An "interior layer" is a layer that generally has both of its surfaces directly adjacent and coextensive with two other layers of the film.

First layer 50 may have a thickness comprising no more than about any of the following percentages of the total thickness of the film: 50%, 40%, 30%, 25%, 20%, 18%, 15%, 13%, 10%, and 5%.

First layer 50 may comprise one or more polyethylene thermoplastic polymers. Useful polyethylene polymers include those having a density of at least about any of the following: 0.910 g/cc, 0.915 g/cc, and 0.920 g/cc. Useful polyethylene polymers include ethylene homopolymers (e.g., low density polyethylene or "LDPE") and ethylene copolymers. Ethylene copolymers include ethylene/alpha-olefin copolymers ("EAOs"), ethylene/unsaturated ester copolymers, and ethylene/(meth)acrylic acid. "Copolymer" as used in this application means a polymer derived from two or more types of monomers, and includes terpolymers, etc.

EAOs are copolymers of ethylene and one or more alpha-olefins, the copolymer having ethylene as the majority mole-percentage content. Preferably, the comonomer includes one or more $C_3$–$C_{20}$ α-olefins, more preferably one or more $C_4$–$C_{12}$ α-olefins, and most preferably one or more $C_4$–$C_8$ α-olefins. Particularly preferred α-olefins include 1-butene, 1-hexene, 1-octene, and mixtures thereof.

EAOs include one or more of the following: 1) medium density polyethylene ("MDPE"), for example having a density of from 0.93 to 0.94 g/cm3; 2) linear medium density polyethylene ("LMDPE"), for example having a density of from 0.926 to 0.94 g/cm3; 3) linear low density polyethylene ("LLDPE"), for example having a density of from 0.915 to 0.930 g/cm3; 4) very-low or ultra-low density polyethylene ("VLDPE" and "ULDPE"), for example having density below 0.915 g/cm3, and 5) homogeneous EAOs. Useful EAOs for first layer 50 may include those having a density of less than about any of the following: 0.925, 0.922, 0.92, 0.917, 0.915, and 0.912 grams/cubic centimeter. Unless otherwise indicated, all densities herein are measured according to ASTM D1505.

The polyethylene polymers may be either heterogeneous or homogeneous. As is known in the art, heterogeneous polymers have a relatively wide variation in molecular weight and composition distribution. Heterogeneous polymers may be prepared with, for example, conventional Ziegler Natta catalysts.

On the other hand, homogeneous polymers are typically prepared using metallocene or other single site-type catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions. Examples of homogeneous polymers include the metallocene-catalyzed linear homogeneous ethylene/alpha-olefin copolymer resins available from the Exxon Chemical Company (Baytown, Tex.) under the EXACT trademark, linear homogeneous ethylene/alpha-olefin copolymer resins available from the Mitsui Petrochemical Corporation under the TAFMER trademark, and long-chain branched, metallocene-catalyzed homogeneous ethylene/alpha-olefin copolymer resins available from the Dow Chemical Company under the AFFINITY trademark.

Another useful ethylene copolymer is ethylene/unsaturated ester copolymer, which is the copolymer of ethylene and one or more unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth)acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Another useful ethylene copolymer is ethylene/(meth)acrylic acid, which is the copolymer of ethylene and acrylic acid, methacrylic acid, or both.

The first layer 50 may comprise the above described ethylene polymer having a density of above about 0.910 g/cc—or any one of the above described ethylene polymers having a density of above about 0.910 g/cc—in an amount of at least about any of the following values: 60%, 70%, 75%, 80%, 85%, 90%, 95%, 99%, and 100% by weight of the first layer.

Film 20 comprises second layer 52, which may be an interior layer of film 20, as shown in FIGS. 3 and 4, or may be an outer layer of film 20 (not shown). Second layer 52 may be directly adjacent to first layer 50, that is, without any intervening interior layers between second layer 52 and first layer 50 as shown in FIG. 3, and may have one or more layers on the other side of second layer 52. Further, one or more interior layers may intervene between second layer 52 and first layer 50, as shown in FIG. 4.

Second layer 52 may have a thickness comprising at least about any of the following percentages of the total thickness of the film: 40%, 50%, 60%, 70%, 75%, 80%, 85%, 90%, and 95%.

Second layer 52 may comprise one or more of any of the EAOs described above (e.g., heterogeneous or homogeneous EAOs) having a density of less than about any of the following: 0.910 g/cc, 0.905 g/cc, 0.900 g/cc, 0.895 g/cc, 0.890 g/cc, 0.885 g/cc, and 0.880 g/cc.

Second layer 52 may comprise the above described EAO having a density of less than about 0.910 g/cc—or any one of the above described EAOs having a density of less than about 0.910 g/cc—in an amount of at least about any of the following values: 60%, 70%, 75%, 80%, 85%, 90%, 95%, 99%, and 100% by weight of the second layer.

Second layer 52 may comprises a blend of EAOs having different densities of less than about 0.910 g/cc, for example a blend of a first homogeneous EAO having a density of less than about 0.910 g/cc and a second homogeneous EAO having a density of less than about any of the following values: 0.900 g/cc, 0.895 g/cc, 0.890 g/cc, 0.885 g/cc, and 0.880 g/cc.

Film 20 may comprise third layer 54, for example as an outer layer as shown in FIGS. 3 and 4. Third layer 54 may have the same or a different composition relative first layer 50. A different composition for third layer 54 may be any of those described above with respect to first layer 50. Third layer 54 may have any of the thicknesses as set forth for first layer 50. Third layer 54 may be directly adjacent to second layer 52, that is, without any intervening interior layers between third layer 54 and second layer 52 as shown in FIG. 3, or may have one or more interior layers intervening between third layer 54 and second layer 52, as shown in FIG. 4.

Film 20 may comprises one or more additional layers to the first, second, and third layers 50, 52, 54. One or more of the additional layers may comprise ethylene/alpha-olefin copolymer having a density of less than about 0.910 g/cc. For example, film 20 may comprise fourth layer 56 as an interior layer between first layer 50 and second layer 52. Film 20 may also comprise fifth layer 58 as an interior layer between second layer 52 and third layer 54. (FIG. 4.) Fourth or fifth layers 56, 58 may be directly adjacent to either of the first, second, or third layers 50, 52, and 54, or may have additional intervening layers. Fourth and fifth layers 56, 58 may each comprise any of the compositions and thicknesses as set forth for first and second layers 50, 52. The fourth and fifth layers may have the same composition or thickness—or may have different compositions or thicknesses. Where the second layer 52 comprises a first homogeneous EAO having a density of less than about 0.910 g/cc, fourth or fifth layers 56, 58 (or both) may comprise a second homogeneous EAO copolymer that has a density less than about 0.910 g/cc and greater than the density of the first homogeneous EAO of second layer 52. Fourth or fifth layers 56, 58 (or both) may comprise the second EAO in an amount of at least about any of the following values: 60%, 70%, 75%, 80%, 85%, 90%, 95%, 99%, and 100% by weight of the fourth or fifth layer, as the case may be.

Film 20 may include effective amounts of tackifiers, antiblocking agents, and slip agents—or may be essentially free of any of these components. Tackifiers, antiblocking agents, and slip agents, and their effective amounts, are well known to those of skill in the art.

Film 20 may have an elastic recovery in either or both of the transverse and longitudinal directions of at least about any of the following values: 60%, 65%, 70%, 75%, 80%, and 85%, measured according to ASTM D5459-95 at 100% strain, 30 seconds relaxation time, and 60 second recovery time.

Film 20 may have a maximum load tear resistance in either or both of the transverse and longitudinal directions of at least about any of the following values: 400, 450, 500, 550, and 600 grams force, measured according to ASTM D1004-94a.

Film 20 may have a slow puncture maximum load of at least about any of the following values: 4, 4.5, 5, 5.5, 6, 6.5, and 7 pounds force, measured according to ASTM F1306-90 using a crosshead speed of 5 inches per minute.

Film 20 may have a Young's modulus sufficient to withstand the expected handling and use conditions, yet provide a "soft" feel that may be desirable for a packaging application. Film 20 may have a Young's modulus of at least about any of the following values: 2,000; 2,500; 3,000; 3,500; and 4,000 pounds/square inch. Film 20 may have a Young's modulus of no more than about any of the following values: 8,000; 10,000; 15,000; 20,000; 30,000; and 40,000 pounds/square inch. The Young's modulus is measured in accordance with ASTM D882, measured at a temperature of 73° F.

Film 20 preferably has low haze characteristics. Haze is a measurement of the transmitted light scattered more than 2.5° from the axis of the incident light. Haze is measured against the outside surface of the film (e.g., first layer 50), according to the method of ASTM D1003-00, which is incorporated herein in its entirety by reference. All references to "haze" values in this application are by this standard. The haze of film 20 may be no more than about any of the following values: 20%, 15%, 10%, 9%, 8%, 7%, 6%, 5%, 4%, and 3%.

Film 20 may have a gloss, as measured against the outside surface of the film (e.g., against first layer 50) of at least about any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle).

Film 20 may be transparent so that the packaged object 28 is visible through the film. "Transparent" as used herein means that the material transmits incident light with negligible scattering and little absorption, enabling objects to be seen clearly through the material under typical unaided viewing conditions (i.e., the expected use conditions of the material). The transparency (i.e., clarity) of film 20 may be at least about any of the following values: 65%, 70%, 75%, 80%, 85%, and 90%, measured in accordance with ASTM D1746.

Film 20 may be manufactured by thermoplastic film-forming processes known in the art (e.g., tubular or blown-film extrusion, coextrusion, extrusion coating, flat or cast film extrusion). A combination of these processes may also be employed.

At least one side of film 20 may be corona and/or plasma treated to change the surface energy of the film, for example, to increase the ability of the film to adhere to frame 22 or 24.

The following examples are presented for the purpose of further illustrating and explaining the present invention and are not to be taken as limiting in any regard. Unless otherwise indicated, all parts and percentages are by weight.

EXAMPLES

In the examples below, the following materials were used:

"AB" is an antiblock agent masterbatch of low density polyethylene with W210 Zeeospheres, available from Ampacet Corporation under the 101104AB AO trade name.

"LDPE" is a low density polyethylene having a density of 0.922 g/cc, a melt flow index of 1.8 (condition E), and a melt point of 112° C., available from Equistar Corporation under the NA345-013 trade name.

"LLDPE" is a heterogeneous ethylene/hexene copolymer having about 10% hexene monomer content, a density of 0.9175 g/cc, and a melt flow index of 3.2, available from Exxon Corporation (Houston, Tex.) under the ESCORENE LL3003.32 trademark.

"MPE1" is a long-chain branched homogeneous ethylene/octene copolymer having a density of 0.870 g/cc and a melt flow index of 1.0, available from Dow Chemical Company (Midland, Mich.) under the AFFINITY EG 8100 trademark.

"MPE2" is a linear homogeneous ethylene/butene copolymer having a density of 0.900 g/cc and a melt flow index of 1.2, available from Exxon Corporation (Houston, Tex.) under the EXACT 3128 trademark.

"Slip" is an n,n'-ethylene-bis-stearamide slip agent having a specific gravity of 0.995 and a DSC melting point of 146° C., available from Crompton Corporation (previously Witco Corporation) under the KEMAMIDE W-40 trademark.

Each of the following example films was made as a coextruded, hot-blown film. The example films may be adhered to a frame to form the packaging structure, as discussed above.

EXAMPLE 1

|  | Layer Composition (Weight %) | Layer thickness (mils) |
|---|---|---|
| Layer 1 | LDPE (100%) | 0.4 |
| Layer 2 | MPE1 (55%) MPE2 (45%) | 3.2 |
| Layer 3 | LDPE (100%) | 0.4 |

Example 1 had a total thickness of 4 mils, a haze of 4.3% (measured according to ASTM D1003-00) and a gloss of 82% (measured according to ASTM D2457-97, 45° angle). Measurements of subsequent examples are according to these ASTM methods.

EXAMPLE 2

|  | Layer Composition (Weight %) | Layer thickness (mils) |
|---|---|---|
| Layer 1 | LDPE (100%) | 0.45 |
| Layer 2 | MPE2 (100%) | 0.4 |
| Layer 3 | MPE1 (100%) | 2.3 |
| Layer 4 | MPE2 (100%) | 0.4 |
| Layer 5 | LDPE (100%) | 0.45 |

Example 2 had a total thickness of 4 mils, a haze of 4.9% and a gloss of 80%.

EXAMPLE 3

|  | Layer Composition (Weight %) | Layer thickness (mils) |
|---|---|---|
| Layer 1 | LDPE (100%) | 0.2 |
| Layer 2 | MPE2 (100%) | 0.4 |
| Layer 3 | MPE1 (100%) | 2.8 |
| Layer 4 | MPE2 (100%) | 0.4 |
| Layer 5 | LDPE (100%) | 0.2 |

Example 3 had a total thickness of 4 mils, a haze of 3.5% and a gloss of 82%.

EXAMPLE 4

|  | Layer Composition (Weight %) | Layer thickness (mils) |
|---|---|---|
| Layer 1 | LDPE (47.45%); LLDPE (47.45%); AB (5%); Slip (0.1%) | 0.45 |
| Layer 2 | MPE2 (100%) | 0.4 |
| Layer 3 | MPE1 (100%) | 2.3 |
| Layer 4 | MPE2 (100%) | 0.4 |
| Layer 5 | LDPE (47.45%); LLDPE (47.45%); AB (5%); Slip (0.1%) | 0.45 |

Example 4 had a total thickness of 4 mils, a haze of 9.4% and a gloss of 66%.

EXAMPLE 5

|  | Layer Composition (Weight %) | Layer thickness (mils) |
|---|---|---|
| Layer 1 | LDPE (100%) | 0.4 |
| Layer 2 | MPE1 (100%) | 3.2 |
| Layer 3 | LDPE (100%) | 0.4 |

Example 5 had a total thickness of 4 mils, a haze of 2.9% and a gloss of 85%.

EXAMPLE 6

|  | Layer Composition (Weight %) | Layer thickness (mils) |
|---|---|---|
| Layer 1 | LDPE (71.175%); LLDPE (23.725%); AB (5%); Slip (0.1%) | 0.4 |
| Layer 2 | MPE1 (100%) | 3.2 |
| Layer 3 | LDPE (71.175%); LLDPE (23.725%); AB (5%); Slip (0.1%) | 0.4 |

Example 6 had a total thickness of 4 mils, a haze of 4.7% and a gloss of 76%.

EXAMPLE 7

|  | Layer Composition (Weight %) | Layer thickness (mils) |
|---|---|---|
| Layer 1 | LDPE (47.45%); LLDPE (47.45%); AB (5%); Slip (0.1%) | 0.4 |
| Layer 2 | MPE1 (100%) | 3.2 |
| Layer 3 | LDPE (47.45%); LLDPE (47.45%); AB (5%); Slip (0.1%) | 0.4 |

Example 7 had a total thickness of 4 mils, a haze of 7.5% and a gloss of 73%.

TABLE 1

Slow Puncture

|  | Ex. 1 | Ex. 2 | Ex. 3 | Ex. 4 | Ex. 5 | Ex. 6 | Ex. 7 |
|---|---|---|---|---|---|---|---|
| Slow Puncture max. load (lbf) | 6.67 | 5.15 | 5.63 | 5.62 | 4.09 | 4.32 | 4.06 |
| Load at break (lbf) | 6.67 | 5.15 | 5.63 | 5.62 | 4.09 | 4.32 | 4.06 |
| Displacement at break (in) | 2.1 | 1.7 | 2.3 | 1.9 | 2.0 | 2.1 | 1.8 |
| Energy to break (lbf-in) | 7.06 | 4.52 | 6.61 | 5.55 | 4.42 | 4.98 | 3.81 |
| Toughness (psi) | 376 | 241 | 356 | 300 | 294 | 301 | 228 |

Slow puncture testing was conducted on the examples according to ASTM F1306-90 using a crosshead speed of 5 inches per minute.

TABLE 2

Tear Resistance

|  | Ex. 1 | Ex. 2 | Ex. 3 | Ex. 4 | Ex. 5 | Ex. 6 | Ex. 7 |
|---|---|---|---|---|---|---|---|
| Transverse: | | | | | | | |
| Max. Load (gmf) | 591.87 | 598.00 | 564.71 | 645.63 | 436.32 | 505.29 | 540.71 |
| Energy to break (gmf-in) | 855.45 | 1022.18 | 1186.24 | 1280.90 | 685.66 | 887.84 | 980.3 |
| Disp. @ break (in) | 1.8 | 2.2 | 2.7 | 2.5 | 2.0 | 2.2 | 2.3 |
| Longitudinal: | | | | | | | |
| Max. Load (gmf) | 599.73 | 632.35 | 602.99 | 647.55 | 418.68 | 469.07 | 532.15 |
| Energy to break (gmf-in) | 856.25 | 1108.99 | 1334.00 | 1465.53 | 606.89 | 742.64 | 935.88 |
| Disp. @ break (in) | 1.8 | 2.2 | 2.8 | 2.8 | 1.8 | 2.0 | 2.2 |

Tear resistance was measured according to ASTM D1004-94a.

TABLE 3

Tear Propagation Resistance

|  | Ex. 1 | Ex. 2 | Ex. 3 | Ex. 4 | Ex. 5 | Ex. 6 | Ex. 7 |
|---|---|---|---|---|---|---|---|
| Transverse: | | | | | | | |
| Avg. Load (gmf) | 296 | 287 | 259 | 294.00 | 224 | 213 | 280 |
| Load at max. (gmf) | 532 | 478 | 450 | 514.00 | 372 | 352 | 454 |
| Energy to break (gmf-in) | 1362 | 1287 | 1135 | 1535.00 | 930 | 844.1 | 1069 |
| Displacement at break (in) | 3.7 | 3.7 | 3.6 | 4.10 | 3.5 | 3.4 | 3.3 |
| Longitudinal: | | | | | | | |
| Avg. Load (gmf) | 267 | 267 | 255 | 263 | 188 | 193 | 234 |
| Load at max. (gmf) | 457 | 467 | 457 | 465 | 291 | 320 | 395 |
| Energy to break (gmf-in) | 927.8 | 1040.0 | 1073.0 | 1047.0 | 557.1 | 671.0 | 788.2 |
| Displacement at break (in) | 3.0 | 3.3 | 3.5 | 3.3 | 2.8 | 3.1 | 3.0 |

The tear propagation resistance was measured according to ASTM D1938-94.

TABLE 3

Tensile Strength and Elongation

|  | Ex. 1 | Ex. 2 | Ex. 3 | Ex. 4 | Ex. 5 | Ex. 6 | Ex. 7 |
|---|---|---|---|---|---|---|---|
| Transverse: | | | | | | | |
| psi at 50% strain | 744 | 733 | 567 | 751 | 616 | 555 | 659 |
| psi at 75% strain | 789 | 770 | 605 | 769 | 637 | 582 | 675 |
| psi at 100% strain | 802 | 777 | 624 | 778 | 644 | 595 | 680 |
| psi at 125% strain | 819 | 789 | 641 | 795 | 655 | 605 | 687 |
| psi at 150% strain | 837 | 785 | 657 | 810 | 664 | 616 | 694 |
| psi at break | 5770 | 3820 | 5520 | 4930 | 3860 | 4190 | 4490 |
| Elongation at break (%) | 860 | 840 | 870 | 870 | 840 | 860 | 870 |
| Longitudinal: | | | | | | | |
| psi at 50% strain | 792 | 716 | 581 | 730 | 662 | 584 | 674 |
| psi at 75% strain | 849 | 760 | 625 | 767 | 703 | 622 | 702 |
| psi at 100% strain | 872 | 777 | 647 | 779 | 725 | 643 | 714 |
| psi at 125% strain | 885 | 789 | 663 | 786 | 741 | 661 | 725 |
| psi at 150% strain | 895 | 801 | 678 | 794 | 758 | 677 | 736 |
| psi at break | 4950 | 4190 | 4110 | 3720 | 3390 | 3950 | 4390 |
| Elongation at break (%) | 820 | 820 | 820 | 800 | 780 | 810 | 830 |

The tensile strengths were measured according to ASTM D882-97 using an Instron crosshead speed of 20 in/minute.

TABLE 4

Elastic Recovery

|  | Ex. 1 | Ex. 2 | Ex. 3 | Ex. 4 | Ex. 5 | Ex. 6 | Ex. 7 |
|---|---|---|---|---|---|---|---|
| Transverse: | | | | | | | |
| 50% Strain/ 30 sec Relax Time/60 sec Recovery Time: | | | | | | | |
| Elastic Recovery (%) | 87.15 | 89.61 | 91.08 | 86.37 | 89.96 | 91.43 | 87.51 |
| Stress Retention (%) | 76.42 | 75.65 | 79.06 | 73.75 | 75.76 | 76.98 | 73.03 |
| Permanent Deform. (%) | 12.85 | 10.39 | 8.92 | 13.63 | 10.14 | 8.57 | 12.49 |
| 75% Strain/ 30 sec Relax Time/60 sec Recovery Time: | | | | | | | |
| Elastic Recovery (%) | 84.87 | 84.78 | 86.03 | 77.21 | 87.36 | 86.08 | 84.32 |
| Stress Retention (%) | 76.39 | 75.25 | 78.02 | 74.51 | 75.61 | 77.03 | 73.85 |
| Permanent Deform. (%) | 15.13 | 15.22 | 13.97 | 22.79 | 12.64 | 13.92 | 15.68 |
| 100% Strain/ 30 sec Relax Time/60 sec Recovery Time: | | | | | | | |
| Elastic Recovery (%) | 76.84 | 75.77 | 79.60 | 72.36 | 79.91 | 82.60 | 78.62 |
| Stress Retention (%) | 76.82 | 75.87 | 77.67 | 74.70 | 76.26 | 76.86 | 72.40 |
| Permanent Deform. (%) | 23.16 | 24.23 | 20.40 | 27.64 | 20.09 | 17.40 | 21.31 |
| Longitudinal: | | | | | | | |
| 50% Strain/ 30 sec Relax Time/60 sec Recovery Time: | | | | | | | |
| Elastic Recovery (%) | 89.66 | 88.21 | 90.18 | 87.18 | 89.89 | 92.39 | 87.86 |
| Stress Retention (%) | 76.22 | 76.41 | 79.02 | 74.23 | 76.19 | 77.38 | 73.46 |
| Permanent Deform. (%) | 10.34 | 11.79 | 9.82 | 12.82 | 10.11 | 7.61 | 12.14 |
| 75% Strain/ 30 sec Relax Time/60 sec Recovery Time: | | | | | | | |
| Elastic Recovery (%) | 85.75 | 84.33 | 86.89 | 82.03 | 86.95 | 90.45 | 84.30 |
| Stress Retention (%) | 76.05 | 75.50 | 77.35 | 74.04 | 75.62 | 76.72 | 73.74 |
| Permanent Deform. (%) | 14.25 | 15.67 | 13.11 | 17.97 | 13.05 | 9.55 | 15.70 |
| 100% Strain/ 30 sec Relax Time/60 sec Recovery Time: | | | | | | | |
| Elastic Recovery (%) | 78.02 | 77.96 | 81.38 | 76.31 | 83.02 | 87.42 | 79.08 |
| Stress Retention (%) | 75.76 | 75.76 | 76.77 | 74.25 | 75.17 | 76.11 | 72.17 |
| Permanent Deform. (%) | 21.98 | 22.04 | 18.62 | 23.69 | 16.98 | 12.58 | 20.92 |

Elastic recovery data was measured according to ASTM D5459-95, each with 4 one-inch wide strips in both the longitudinal and transverse directions.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. All references to ASTM tests (other than to ASTM D790-95) are to the most recent, currently approved, and published version of the ASTM test identified, as of the priority filing date of this application. Each ASTM test method publication referenced in this application is incorporated herein in its entirety by reference.

What is claimed is:

1. A packaging structure comprising:
   a frame;
   a film connected to the frame, the film having a given total thickness and comprising:
   a first layer as an outer layer of the film, the first layer comprising polyethylene polymer having a density of at least about 0.910 g/cc, wherein the first layer comprises no more than about 20% of the total thickness of the film; and
   a second layer comprising ethylene/alpha-olefin copolymer having a density of less than about 0.910 g/cc, wherein the film has an elastic recovery in each of the transverse and longitudinal directions of at least about 60% measured according to ASTM D5459-95 at 100% strain, 30 seconds relaxation time, and 60 second recovery time.

2. The structure of claim 1 wherein the second layer comprises at least about 70% ethylene/alpha-olefin copolymer having a density of less than about 0.910 g/cc, measured by weight of the second layer.

3. The structure of claim 1 wherein the second layer comprises at least about 95% ethylene/alpha-olefin copolymer having a density of less than about 0.910 g/cc, measured by weight of the second layer.

4. The structure of claim 1 wherein the ethylene/alpha-olefin copolymer having a density of less than about 0.910 g/cc is homogeneous ethylene/alpha-olefin copolymer.

5. The structure of claim 1 wherein the second layer comprises a blend comprising first and second homogeneous ethylene/alpha-olefin copolymers, the first homogeneous ethylene/alpha-olefin copolymer having a density of less than about 0.910 g/cc and the second homogeneous ethylene/alpha-olefin copolymer having a density of less than about 0.900.

6. The structure of claim 5 wherein the second homogeneous ethylene/alpha-olefin copolymer has a density of less than about 0.880.

7. The structure of claim 1 wherein the second layer is another outer layer of the film.

8. The structure of claim 1 wherein the second layer is an interior layer of the film.

9. The structure of claim 1 wherein the second layer comprises at least about 50% of the total film thickness.

10. The structure of claim 1 wherein the first layer comprises at least about 70% polyethylene polymer having a density of at least about 0.910 g/cc, measured by weight of the first layer.

11. The structure of claim 1 wherein the first layer comprises at least about 95% polyethylene polymer having a density of at least about 0.910 g/cc, measured by weight of the first layer.

12. The structure of claim 1 wherein the polyethylene polymer having a density of at least about 0.910 g/cc is selected from one or more of ethylene homopolymer, ethylene/alpha-olefin copolymers, ethylene/unsaturated ester copolymers, and ethylene/(meth)acrylic acid.

13. The structure of claim 1 wherein the first layer comprises at least about 70% low density polyethylene by weight of the first layer.

14. The structure of claim 1 wherein the first layer comprises at least about 95% low density polyethylene by weight of the first layer.

15. The structure of claim 1 wherein the first layer comprises at least about 70% linear low density polyethylene by weight of the first layer.

16. The structure of claim 1 wherein the first layer comprises at least about 70% ethylene/vinyl acetate copolymer by weight of the first layer.

17. The structure of claim 1 wherein the first layer comprises at least about 70% ethylene/alkyl (meth)acrylate copolymer by weight of the first layer.

18. The structure of claim 1 wherein the first layer comprises no more than about 15% of the total thickness of the film.

19. The structure of claim 1 wherein the film further comprises a third layer as another outer layer of the film, the third layer comprising polyethylene polymer having a density of at least about 0.910 g/cc, wherein the third layer comprises no more than about 20% of the total thickness of the film.

20. The structure of claim 19 wherein the first and third layers are directly adjacent to the second layer.

21. The structure of claim 1 wherein the film further comprises one or more additional layers each comprising ethylene/alpha-olefin copolymer having a density of less than about 0.910 g/cc.

22. The structure of claim 1 wherein:
the second layer comprises a first homogeneous ethylene/alpha-olefin copolymer having a density of less than about 0.910 g/cc; and
the film further comprises a third layer between the first and second layers, wherein the third layer comprises a second homogeneous ethylene/alpha-olefin copolymer having a density of less than about 0.910 g/cc and greater than the density of the first homogeneous ethylene/alpha-olefin copolymer.

23. The structure of claim 1 wherein the film is essentially free of tackifiers.

24. The structure of claim 1 wherein the film is essentially free of antiblocking agents.

25. The structure of claim 1 wherein the film is essentially free of slip agents.

26. The structure of claim 1 wherein the film has an maximum load tear resistance in each of the transverse and longitudinal directions measured according to ASTM D1004-94a of at least about 400 grams force.

27. The structure of claim 1 wherein the film has a slow puncture maximum load of at least about 4 pounds force, measured according to ASTM F1306-90 with a crosshead speed of 5 inches per minute.

28. The structure of claim 1 wherein the film has a gloss measured against the first layer according to ASTM D2457 (45° angle) of at least about 75% and a haze measured against the first layer according to ASTM D1003-00 of no more than about 10%.

29. The structure of claim 1 wherein the frame defines an opening and the film covers the frame opening.

30. A package comprising two packaging structures of claim 29 in opposed arrangement.

31. The structure of claim 1 wherein the frame comprises a perimeter zone surrounding the opening and the film is adhered to the frame at the perimeter zone.

32. The structure of claim 1 wherein the film is continuously adhered to the frame at the perimeter zone.

33. The structure of claim 1 wherein the film has a total thickness ranging from about 2 to about 6 mils.

34. The structure of claim 1 wherein the frame comprises corrugated cardboard.

35. The structure of claim 1 wherein the frame is foldable.

36. A packaging structure comprising:
a foldable frame;
a film adhered to the frame in one or more selected zones, the film having a total thickness ranging from about 2 to about 6 mils and comprising:
a first layer as an outer layer of the film, the first layer comprising at least about 95%, by weight of the first layer, low density polyethylene having a density of at least about 0.910 g/cc, wherein the first layer comprises no more than about 15% of the total thickness of the film; and
a second layer comprising a blend comprising first and second homogeneous ethylene/alpha-olefin copolymers, the first homogeneous ethylene/alpha-olefin copolymer having a density of less than about 0.910 g/cc and the second homogeneous ethylene/alpha-olefin copolymer having a density of less than about 0.890, wherein at least about 95 weight % of the second layer comprises the blend, measured by weight of the second layer, wherein the second layer:
is an interior layer of the film; and
comprises at least about 70% of the total film thickness; and
a third layer as another outer layer of the film, the third layer comprising polyethylene polymer having a density of at least about 0.910 g/cc, wherein the third layer comprises no more than about 15% of the total thickness of the film, and wherein the first and third layers are directly adjacent to the second layer;
wherein the film:
has an elastic recovery in each of the transverse and longitudinal directions of at least about 60% measured according to ASTM D5459-95 at 100% strain, 30 seconds relaxation time, and 60 second recovery time;
is essentially free of tackifiers;
has an maximum load tear resistance in each of the transverse and longitudinal directions measured according to ASTM D1004-94a of at least about 400 grams force;
has a slow puncture maximum load of at least about 4 pounds force, measured according to ASTM F1306-90 with a crosshead speed of 5 inches per minute;
has a gloss measured against the first layer according to ASTM D2457 (45° angle) of at least about 75%; and
has a haze measured against the first layer according to ASTM D1003-00 of no more than about 10%.

* * * * *